United States Patent
Scudder et al.

(10) Patent No.: US 8,572,225 B2
(45) Date of Patent: *Oct. 29, 2013

(54) TECHNIQUE FOR GRACEFUL SHUTDOWN OF A ROUTING PROTOCOL IN A NETWORK

(75) Inventors: John Galen Scudder, Ann Arbor, MI (US); Muthurajah Sivabalan, Kanata (CA); David D. Ward, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 633 days.

This patent is subject to a terminal disclaimer.

(21) Appl. No.: 12/041,378

(22) Filed: Mar. 3, 2008

(65) Prior Publication Data

US 2008/0147843 A1 Jun. 19, 2008

Related U.S. Application Data

(63) Continuation of application No. 10/775,877, filed on Feb. 10, 2004, now Pat. No. 7,355,983.

(51) Int. Cl.
*G06F 15/173* (2006.01)
*G06F 15/16* (2006.01)

(52) U.S. Cl.
USPC ............ 709/223; 709/230; 709/238; 709/239

(58) Field of Classification Search
USPC .................................. 709/223, 230, 238, 239
See application file for complete search history.

(56) References Cited

U.S. PATENT DOCUMENTS

| | | |
|---|---|---|
| 6,392,997 B1 | 5/2002 | Chen |
| 6,553,423 B1 | 4/2003 | Chen |
| 6,658,595 B1 | 12/2003 | Thamattoor |
| 6,718,376 B1 | 4/2004 | Chu et al. |
| 6,751,188 B1 | 6/2004 | Medved et al. |
| 2003/0202473 A1* | 10/2003 | Patrick et al. ................ 370/235 |
| 2004/0208175 A1 | 10/2004 | McCabe |
| 2005/0089015 A1 | 4/2005 | Tsuge et al. |
| 2005/0135231 A1* | 6/2005 | Bellovin ...................... 370/216 |
| 2005/0147051 A1 | 7/2005 | Suri |
| 2006/0029076 A1 | 2/2006 | Namihira et al. |
| 2006/0045004 A1 | 3/2006 | Charzinski et al. |

OTHER PUBLICATIONS

"OSPF Stub Router Advertisement" A. Retana, A. Zinin , D. McPherson. Network Working Group, Request for Comments: 3137. Jun. 2001.*
"Avoiding Instability during Graceful Shutdown of OSPF" Aman Shaikh, Rohit Dube, Anujan Varma. in Proc. IEEE INFOCOM 2002.*
"Graceful Restart Mechanism for BGP" Srihari R. Sangli, Yakov Rekhter, Rex Fernando, John G. Scudder, Enke Chen. Network Working Group, Internet Draft, Expiration Date: Dec. 2002. <draft-ietf-idr-restart-05.txt>.*

(Continued)

*Primary Examiner* — Noel Beharry
(74) *Attorney, Agent, or Firm* — Cesari and McKenna, LLP

(57) ABSTRACT

In one embodiment, a router generates a notification message that indicates the router is to be gracefully removed from service. The router sends the notification message to peers of the router in a network. The router then continues to forward packets for a grace period after sending the notification message, to permit backup paths to be propagated to peers, and to be put into service, prior to withdrawal from service of paths through the router. Thereafter, the router is removed from service at the expiration of the grace period.

18 Claims, 7 Drawing Sheets

700

| SUBCODE | SYMBOLIC NAME |
|---|---|
| 9 | ADMINISTRATIVE GRACEFUL ROUTER SHUTDOWN |
| 10 | ADMINISTRATIVE GRACEFUL ROUTER RESET |

(56) References Cited

OTHER PUBLICATIONS

"Graceful Restart Mechanism for BGP with MPLS" Yakov Rekhter, Rahul Aggarwal. Network Working Group, Internet Draft, Expiration Date: Apr. 2003. <draft-ietf-mpls-bgp-mpls-restart-02.txt>.*

R. Pearlman, "Interconnections, Bridges and Routers", Addison Wesley Publishing Company, Reading, Massachusetts, pp. 323-329, (1992).

Rekhter et al., "A Border Gateway Protocol 4 (BGP-4)" Request for Comments (RFC) 1771, Internet Engineering Task Force, http://www.ietf.org, Mar. 1995, pp. 1-57.

Rekhter et al, <draft-ietf-idr-bgp4-23.txt> "A Border Gateway Protocol 4 (BGP-4)", Internet Engineering Task Force, Nov. 2003 pp. 1-98.

Tanenbaum, Andrew S., "Computer Networks" Third Edition; Chapter 1, Section 1.4.2, "The TCP/IP Reference Model"; Prentice Hall PTR, 1996, New Jersey, pp. 35-38.

"Notification of Transmittal of the International Search Report and the Written Opinion of the International Searching Authority," of International Application No. PCT/US05/03735 with an International Filing Date of Feb. 7, 2005, pp. 1-9.

\* cited by examiner

"PRIOR ART"

"PRIOR ART"

TECHNIQUE FOR GRACEFUL SHUTDOWN OF A ROUTING PROTOCOL IN A NETWORK

RELATED APPLICATIONS

This Application for United States Patent is a continuation of U.S. patent application Ser. No. 10/775,877 filed on Feb. 10, 2004 by John Galen Scudder, Muthurajah Sivabalan, and David D. Ward, now issued as U.S. Pat. No. 7,355,983, entitled Technique for Graceful Shutdown of a Routing Protocol in a Network, the contents of which are incorporated herein by reference.

FIELD OF THE INVENTION

The invention relates generally to routing protocols used in computer networks and, more particularly, to a technique that enables graceful shutdown or reset of a routing protocol executing on an intermediate node in a computer network.

BACKGROUND OF THE INVENTION

A computer network is a geographically distributed collection of interconnected communication links used to transport data between nodes, such as computers. Many types of computer networks are available, with the types ranging from local area networks to wide area networks. The nodes typically communicate by exchanging discrete packets or messages of data according to pre-defined protocols. In this context, a protocol consists of a set of rules defining how the nodes interact with each other.

Computer networks may be further interconnected by an intermediate node, such as a switch or router, to extend the effective "size" of each network. Since management of a large system of interconnected computer networks can prove burdensome, smaller groups of computer networks may be maintained as routing domains or autonomous systems. The networks within an autonomous system (AS) are typically coupled together by conventional "intradomain" routers. Yet it still may be desirable to increase the number of nodes capable of exchanging data; in this case, interdomain routers executing interdomain routing protocols are used to interconnect nodes of the various ASs.

An example of an interdomain routing protocol is the Border Gateway Protocol version 4 (BGP), which performs routing between autonomous systems by exchanging routing (reachability) information among neighboring interdomain routers of the systems. An adjacency is a relationship formed between selected neighboring (peer) routers for the purpose of exchanging routing information messages and abstracting the network topology. Before transmitting such messages, however, the peers cooperate to establish a logical "peer" connection (session) between the routers. BGP establishes reliable connections/sessions using a reliable/sequenced transport protocol, such as the Transmission Control Protocol (TCP).

The reachability information exchanged by BGP peers typically includes destination address prefixes, i.e., the portions of destination addresses used by the routing protocol to render routing ("next hop") decisions. Examples of such destination addresses include Internet Protocol (IP) version 4 (IPv4) and version 6 (IPv6) addresses. A prefix implies a combination of an IP address and a mask that cooperate to describe an area of the network that a peer can reach. Each prefix may have a number of associated paths; each path is announced to a peer router by one or more of its peers. Note that the combination of a set of path attributes and a prefix is referred to as a "route"; the terms "route" and "path" may be used interchangeably herein. The BGP routing protocol standard is well known and described in detail in *Request For Comments (RFC) 1771*, by Y. Rekhter and T. Li (1995), Internet Draft <draft-ietf-idr-bgp4-23.txt> titled, *A Border Gateway Protocol 4 (BGP-4)* by Y. Rekhter and T. Li (April 2003) and *Interconnections, Bridges and Routers*, by R. Perlman, published by Addison Wesley Publishing Company, at pages 323-329 (1992), all disclosures of which are hereby incorporated by reference.

The interdomain routers configured to execute an implementation of the BGP protocol, referred to herein as BGP routers, perform various routing functions, including transmitting and receiving routing messages and rendering routing decisions based on routing metrics. Each BGP router maintains a routing table that lists all feasible paths from that router to a particular network. The routing table is a database that contains routing information used to construct a forwarding table of a forwarding information base (FIB) that is used by the router when performing forwarding decisions on packets.

Periodic refreshing of the routing table is generally not performed; however, BGP peer routers residing in the ASs exchange routing information under certain circumstances. For example, when a BGP router initially connects to the network, the peer routers exchange the entire contents of their routing tables. Thereafter when changes occur to those contents, the routers exchange only those portions of their routing tables that change in order to update their BGP peers' tables. These update messages are thus incremental update messages sent in response to changes to the contents of the routing tables and announce only a best path to a particular network.

Broadly stated, a BGP router generates routing update messages for an adjacency, also known as a peer router, by "walking-through" the routing table and applying appropriate routing policies. A routing policy is information that enables a BGP router to rank routes according to filtering and preference (i.e., the "best path"). Routing updates provided by the update messages allows BGP routers of the ASs to construct a consistent view of the network topology. The update messages are typically sent using a reliable transport, such as TCP, to ensure reliable delivery. TCP is a transport protocol implemented by a transport layer of the IP architecture; the term TCP/IP is commonly used to denote this architecture. The TCP/IP architecture is well known and described in *Computer Networks, 3rd Edition*, by Andrew S. Tanenbaum, published by Prentice-Hall (1996).

Often maintenance of routers (such as BGP routers) in a network is planned, thereby leading to shutdown or reset of BGP. For example, a BGP router may be shutdown and removed from service in response to, e.g., upgrading of certain hardware or rebooting of the router following a software upgrade. In addition, the router may be reset in response to changing of BGP parameters, such as when a BGP router identifier is changed. However, a planned router shutdown or reset can result in temporary outages (i.e., loss of routing information exchange) for certain routes for which the shutdown router was the best path.

In order to implement a planned shutdown or reset of BGP, the shutdown router sends a conventional BGP Notification message with error code Cease in order to close its connections with its BGP peers. Subsequently to sending the Notification message, the shutdown router closes the TCP sessions over which the connections are established. In some implementations, the Notification message may be omitted. In response to closing the connections, all original routes advertised on those connections are immediately removed (withdrawn) from service (from the FIBs) by the BGP peers.

As a result, some time (i.e., a convergence time) elapses before the network re-converges. In this context, the convergence time is the time that elapses between withdrawal of a route and the time when all subsequent messages triggered by the initial route withdrawal have been exchanged. In general, this can be characterized by the time needed for a BGP router to receive and process update messages from all of its peers, select best paths for each prefix, install those best paths into the routing table and advertise the best paths back to its peers. However, in some networks, multiple such rounds of messages may be required or other factors may also play a part. This approach of simply "halting" the router and re-converging the network leads to temporary loss of routing information due to route withdrawal.

In particular, the above issue arises when the shutdown router was the best path for one or more routes. In that case, the other BGP routers within the AS will not have access to backup paths, even if they are known to certain routers within the AS because announcement of the best path suppresses advertisement of the backup paths. Thus, when the best path is withdrawn from the network, the convergence time elapses before the alternate paths are propagated and selected, leading to temporary loss of routing information. During that elapsed convergence time, traffic for affected networks can be "black holed", i.e., the affected networks' service will be interrupted.

Previous approaches that avoid the temporary loss of routing information due to route withdrawal fall into the category of persistently advertising those routes which are not best paths. In BGP parlance, such routes are sometimes called "best external routes". FIG. 1 is a schematic block diagram illustrating an arrangement of intermediate nodes, such as routers, within an AS of a network. Assume nodes X, Y, and Z are all BGP routers within $AS_N$. Router Y learns a path to a destination D via a BGP router in $AS_M$, and router Z learns a path to the same destination D via a BGP router in $AS_O$. However, the path learned by router Y is "better than" that learned by router Z.

Assume there are internal BGP (iBGP) sessions between X and Y, Y and Z, and Z and X. If only the best path is advertised, router X has only a single path to the destination D and the next-hop for this path is router Y. In order for router X to learn a backup path (not the best), router Z has to advertise the path through $AS_O$, and router X has to store this backup path. This would consume extra network resources (e.g., link bandwidth, processor, and memory) for advertising and storing the backup path, thereby adversely changing the scaling properties of the network.

SUMMARY OF THE INVENTION

The present invention overcomes the disadvantages of the prior art by providing a graceful shutdown technique that modifies a routing protocol to allow an intermediate node, such as a router, to announce to its peer routers (peers) its intention to be gracefully shutdown and removed from service in a network. By announcing its intention to be removed from service, the shutdown router closes (terminates) all connections with its peers and all original routes advertised on those connections are removed (withdrawn) from service. According to the inventive technique, the shutdown router may continue forwarding packets over the network for a "grace" period of time, i.e., the router maintains the validity of those original routes so that packets mapped to the routes are not dropped (at least during the grace period). The grace period also allows backup paths to be propagated to each peer and put into service prior to a final withdrawal of the shutdown router's paths from a forwarding information base (FIB) of the peer. Thus, the grace period enables the network to continue using the shutdown router as a next hop as it re-converges to use the alternate, backup paths.

In the illustrative embodiment, the routing protocol is the Border Gateway Protocol version 4 (BGP) and the shutdown router is a BGP router comprising the best path for one or more of the withdrawn routes. The inventive technique modifies the BGP protocol by providing novel subcodes to a BGP Notification message with error code Cease. These subcodes include Administrative Graceful Router Shutdown (e.g., subcode 9) and Administrative Graceful Router Reset (e.g., subcode 10). The shutdown router indicates that it is able to continue forwarding for the grace period by inserting one of the novel subcodes in the modified Notification message. Each modified Notification message with a Graceful Shutdown/Reset subcode (hereinafter "Graceful Shutdown Notification message") also includes a FIB retention time in a data field of the message. The FIB retention time is set to a value representing the grace period, i.e., a minimum length of time, in seconds, during which the shutdown router will maintain its forwarding state after sending the Graceful Shutdown Notification message.

Upon receiving a Graceful Shutdown Notification message, each BGP peer retains the withdrawn routes associated with the terminated connection until either of two events occur: (1) another route is selected as the best path or (2) the retention time specified in the Graceful Shutdown Notification message has elapsed. After the first event (selection of another best path) occurs, the retained routes may be removed from service (i.e., from the FIB), whereas after the second event (elapse of the retention time) occurs, the retained routes must be removed from the FIB. The inventive technique further provides the notion of marking the original routes as "last resort" routes and, by doing so, triggering other routers in the network to announce backup routes and re-converge without fully withdrawing the original routes.

Advantageously, the inventive technique enables controlled shutdown of a router in a manner that reduces loss of user traffic in a network as opposed to simply halting the router and re-converging the network. In addition, the inventive technique does not adversely change the scaling properties of the network. That is, the present invention does not require routers in the network to store additional paths solely for possible use as backup paths in the event the best path is withdrawn. Moreover, in any network that contains multiple routes for every prefix, the inventive technique described herein results in behavior indistinguishable from operation of the conventional BGP protocol.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 2:
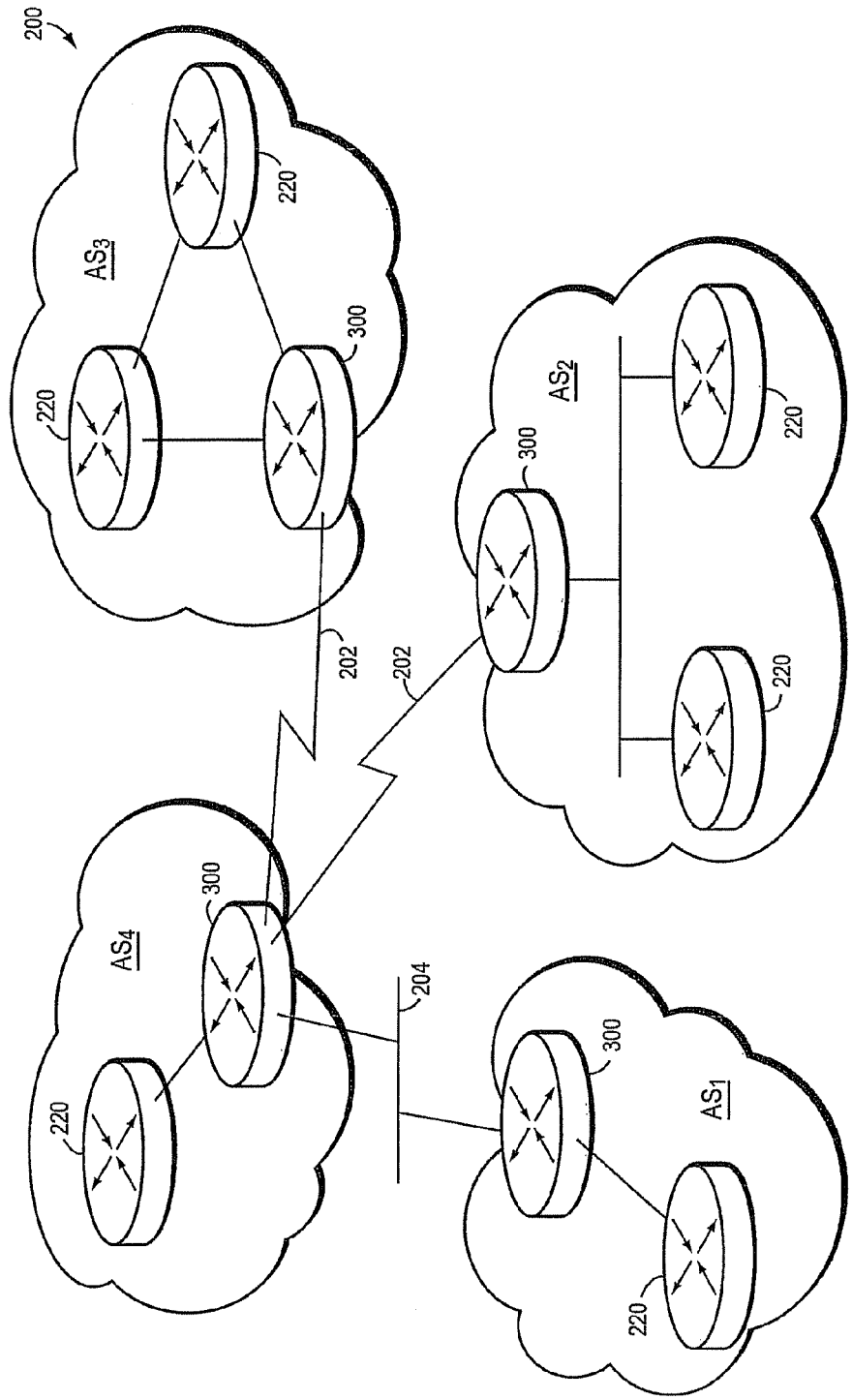
FIG. 2 is a schematic block diagram of a computer network comprising a plurality of routing domains interconnected by intermediate nodes, such as Border Gateway Protocol (BGP) interdomain routers.

FIG. 2 is a schematic block diagram of a computer network 200 comprising a plurality of routing domains interconnected by intermediate nodes. The intermediate nodes may comprise conventional switches but, in the illustrative embodiment, are conventional intradomain routers 220 and interdomain routers 300. The routing domains or autonomous systems ($AS_{1-4}$) are interconnected by the interdomain routers. The interdomain routers 300 are further interconnected by networks, such as local area networks 204, and point-to-point links 202, such as frame relay links, asynchronous transfer mode links or other serial links. Communication among the routers is typically effected by exchanging discrete data packets or messages in accordance with pre-defined protocols, such as the Transmission Control Protocol/Internet Protocol (TCP/IP). It will be understood to those skilled in the art that other protocols, such as the Internet Packet Exchange (IPX) protocol, may be advantageously used with the present invention.

Figure 3:
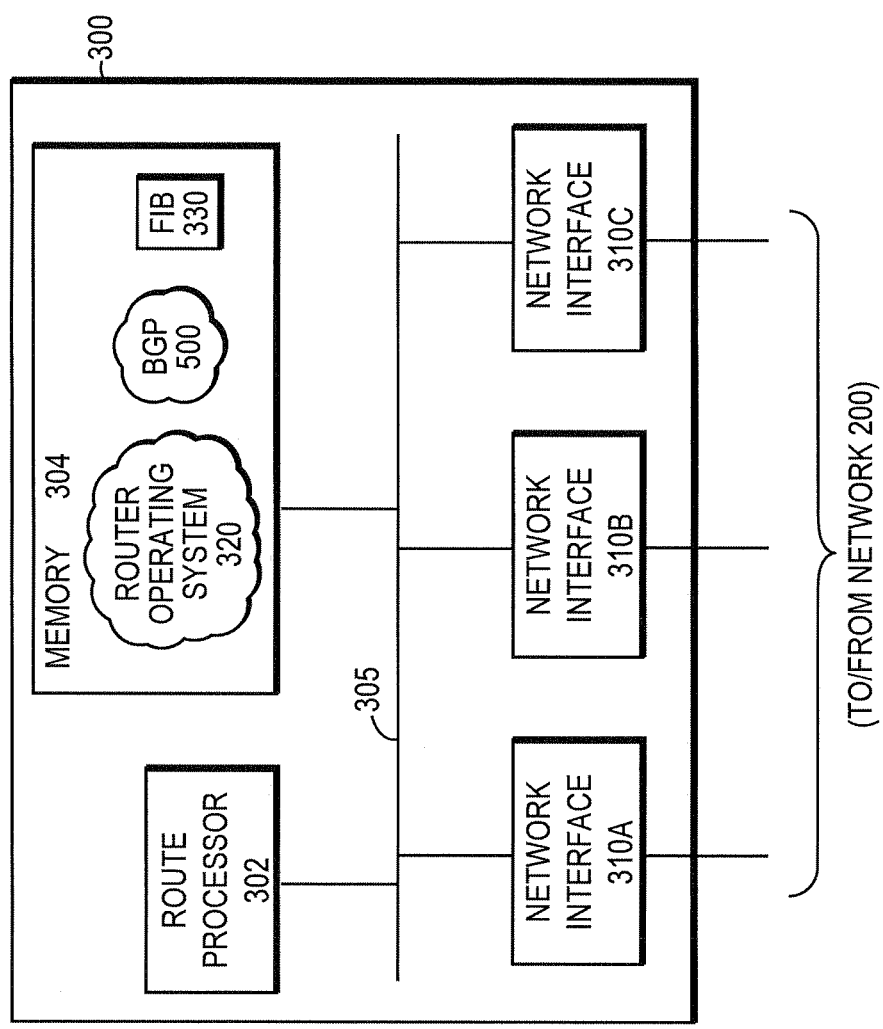
FIG. 3 is a schematic block diagram of an embodiment of an interdomain router that may be advantageously used with the present invention.

FIG. 3 is a schematic block diagram of an interdomain router 300 that may be advantageously used with the present invention. The interdomain router 300 comprises a route processor 302 coupled to a memory 304 and a plurality of network interface adapters $310_{A-C}$ via a bus 305. The memory 304 may comprise storage locations addressable by the processor and interface adapters for storing software programs and data structures, such as a forwarding information base (FIB 330), that may be advantageously used with the inventive technique described herein. The route processor 302 may comprise processing elements or logic for executing the software programs and manipulating the data structures. An operating system 320, portions of which are typically resident in memory 304 and executed by the route processor, functionally organizes the router by, inter alia, invoking network operations in support of software processes and routing protocol modules executing on the router. As described herein, one such routing protocol module is the Border Gateway Protocol version 4 (BGP 500). It will be apparent to those skilled in the art that other processor and memory means, including various computer readable media, may be used for storing and executing program instructions pertaining to the inventive technique described herein.

Figure 4:
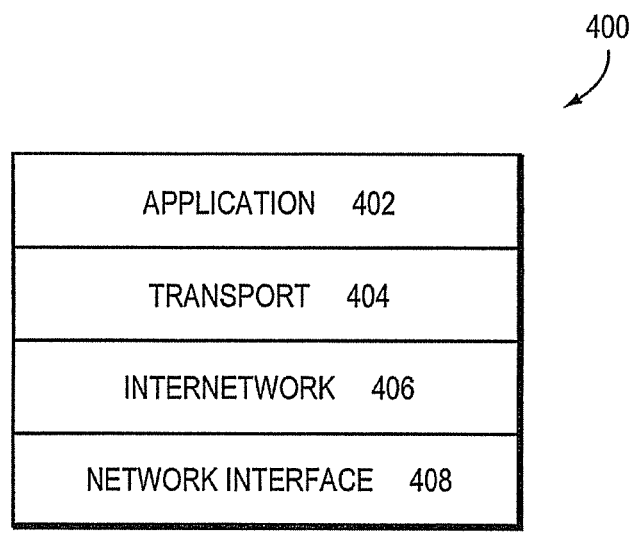
FIG. 4 is a schematic block diagram of a conventional protocol stack, such as the Internet communications protocol stack, within the interdomain router of FIG. 3.

A key function of the interdomain router 300 is determining the next router to which a packet is sent; in order to accomplish such "routing" the interdomain routers cooperate to determine best paths through the computer network 200. The routing function is preferably performed by an internetwork layer of a conventional protocol stack within each router. FIG. 4 is a schematic block diagram of a conventional network protocol stack, such as the Internet communications protocol stack 400. The architecture of the Internet protocol stack is represented by 4 layers termed, in ascending interfacing order, the network interface layer 408, the internetwork layer 406, the transport layer 404 and the application layer 402.

The lower network interface layer 408 is generally standardized and implemented in hardware and firmware, whereas the higher layers may be implemented in the form of software. The primary internetwork layer protocol of the Internet architecture is the IP protocol. IP is primarily a connectionless protocol that provides for internetwork routing, fragmentation and reassembly of exchanged packets—generally referred to as "datagrams" in an Internet environment—and which relies on transport protocols for end-to-end reliability and other service characteristics. An example of such a transport protocol is the TCP protocol, which is implemented by the transport layer 404 and provides connection-oriented, end-to-end reliability services to the upper layer protocols of the Internet architecture. The term TCP/IP is commonly used to denote the Internet architecture.

In particular, the internetwork layer 406 is concerned with how packets are forwarded through the network, although it is not directly concerned with how the FIBs are constructed. An interdomain routing protocol, such as BGP, is used to perform interdomain routing (for the internetwork layer) through the computer network. The interdomain routers 300 (hereinafter "peers") exchange routing and reachability information among the autonomous systems over a reliable transport layer connection, such as TCP. An adjacency is a relationship formed between selected peer routers for the purpose of exchanging routing messages and abstracting the network topology. The BGP protocol "runs" on top of the TCP transport layer 404 to ensure reliable communication of routing messages among the peer routers.

In order to perform routing operations in accordance with the BGP protocol, each interdomain router 300 maintains a routing table that lists all feasible paths from that router to each network. The routing table is a database that contains routing information used to construct a forwarding table of the FIB 330 by the route processor 302 when performing forwarding decisions on packets. The routers exchange the routing information using routing update messages when their routing tables change. The routing update messages are generated by an updating router to advertise best paths to each of its neighboring peer routers (peers) throughout the computer network. These routing updates allow the BGP routers of the autonomous systems to construct a consistent and up-to-date view of the network topology.

Figure 5:
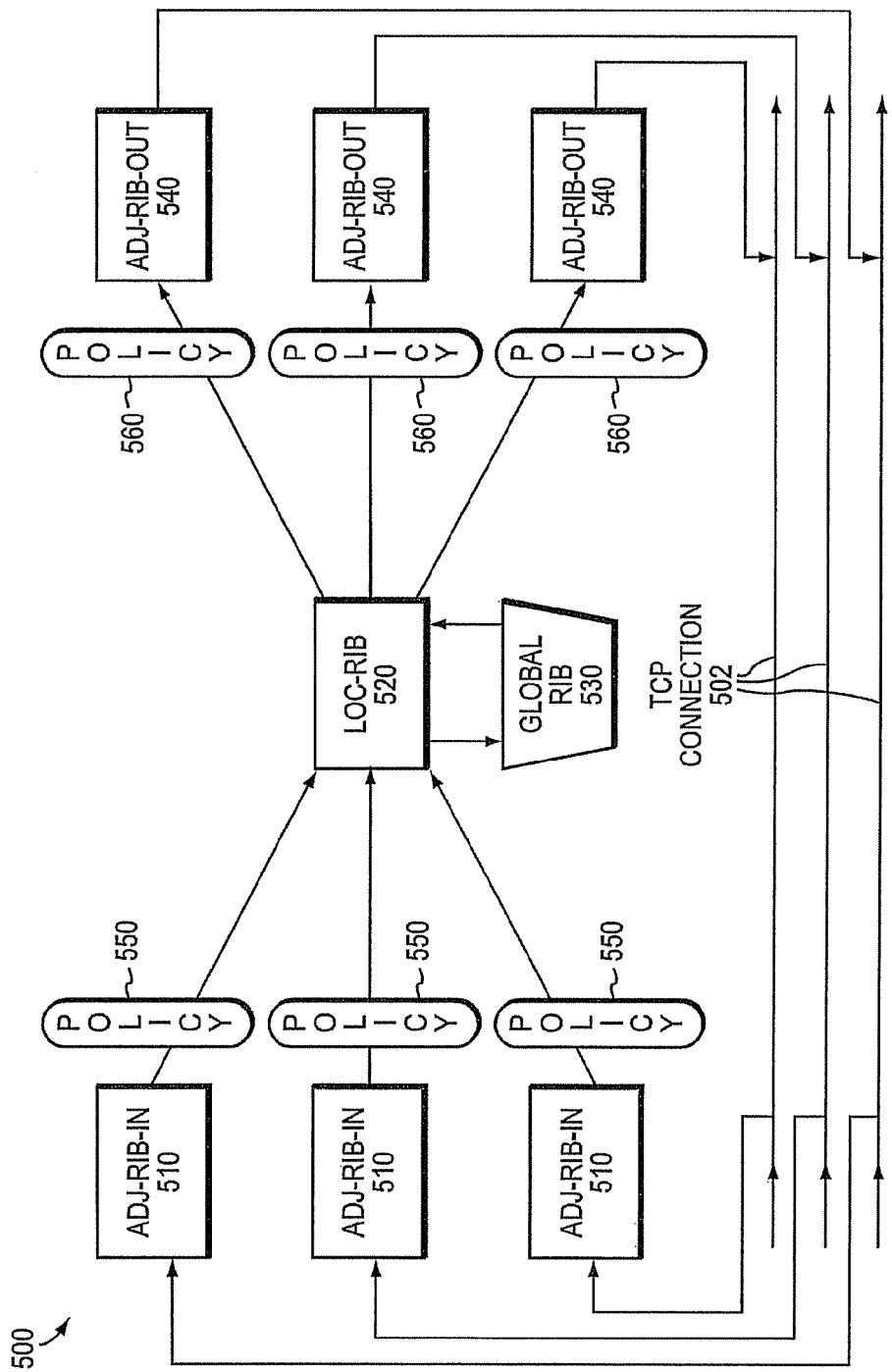
FIG. 5 is a schematic block diagram illustrating the architecture of the BGP protocol.

FIG. 5 is a schematic block diagram illustrating the architecture of the BGP protocol 500 executing on router 300. Peers announce routing updates via TCP connections 502. The BGP protocol "listens" for routing update messages and stores all learned routes for each connection in a BGP database. The BGP database is illustratively organized as Adjacency RIB In (Adj-RIB-In 510), Adjacency RIB Out (Adj-RIB-Out 540) and local RIB (loc-RIB 520). Each peer/TCP connection 502 is associated with an Adj-RIB-In 510 and an Adj-RIB-Out 540. The BGP protocol runs inbound policy on all routes "learned" for each connection 502 and those routes that match are stored in an Adj-RIB-In 510 unique to that connection. Additional inbound policy 550 (filtering) is then applied to those stored routes, with a potentially modified route being installed in the loc-RIB 520.

The loc-RIB stores routes that are similar to the routes in the forwarding table; to that end, the loc-RIB 520 is generally responsible for selecting the best route per prefix from the union of all policy-modified Adj-RIB-In routes, resulting in routes referred to as "best paths". The set of best paths is then installed in the global RIB 530, where those paths may contend with best paths from other protocols to become the "optimal" path ultimately selected for forwarding. The global RIB 530 illustratively maintains the routing table for the router. Note that the routing table typically denotes a database containing all available routes, including ones that have been selected for forwarding (optimal paths) as well as, in some cases, backup routes that are not currently selected for forwarding. In contrast, the forwarding table denotes those optimal best paths that have actually been selected for forwarding. Thereafter, the set of best paths has outbound policy 560 run on it, the result of which is placed in appropriate Adj-RIB-Outs 540 and announced to the respective peers via the same TCP connections 502 from which routing update messages were learned.

Figures 6, 7:
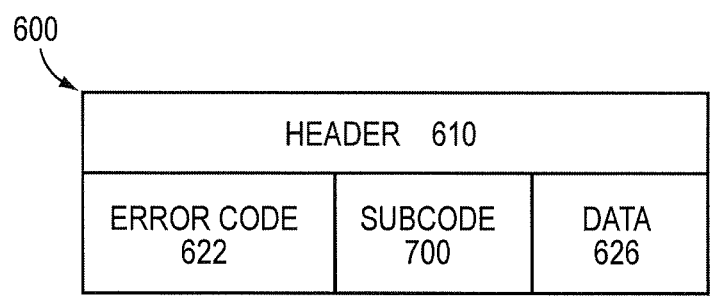
FIG. 6 is a schematic block diagram of a Notification message, such as a BGP Notification message that may be advantageously used with the present invention.
FIG. 7 is a table illustrating novel subcodes for the Notification message with error code Cease in accordance with the present invention.

As noted, maintenance of a BGP router is often planned, thereby leading to shutdown or reset of the BGP protocol 500 executing on the router. In order to implement a planned (controlled) shutdown or reset of BGP, the shutdown router sends a conventional Notification message with error code Cease in order to close its connections with its BGP peers. Subsequently to sending the Notification message, the shutdown router closes the TCP sessions over which the connections are established. In some implementations, the Notification message may be omitted. FIG. 6 is a schematic block diagram of a conventional BGP Notification message 600 comprising a plurality of fields appended to a header 610. An error code field 622 contains an error code indicating the type of Notification message. The Notification message is typically sent in response to a detected error condition; a subcode field 700 of the message 600 contains an error subcode that provides more specific information about the nature of the error. A variable-length data field 626 contains contents used to diagnose the reason for the Notification message and, thus, the contents depend upon the error code and subcode.

According to the BGP protocol, in the absence of a fatal error, a shutdown router may choose to close its BGP connections with its peers by sending the Notification message 600 with Cease (error code 6) specified in the error code field 622. Once the shutdown router closes (terminates) its peering connections, all routes advertised on those connections are immediately removed (withdrawn) from service. Broadly stated, closing of a BGP connection denotes closing of the TCP connection 502 with the BGP peer, clearing of the associated Adj-RIB-In 510 and de-allocating of all resources for the BGP connection. Moreover, entries in the Loc-RIB 520 associated with the shutdown router are marked as invalid. In many network configurations, this has the temporary result that no routes for the depicted (announced) prefixes are available to internal routers in the network. This is particularly problematic when the shutdown router is the best path for one or more of the withdrawn routes. If another BGP router in the autonomous system has backup routes available, it may advertise those backup routes as best paths and forwarding may be resumed, but not before a temporary "black hole" for the affected routes has occurred.

When a BGP router 300 undergoes a controlled shutdown, it is feasible for it to provide forwarding for the routes it has advertised for some period of time (i.e., a "grace" period) prior to removing them from its FIB 330. By providing a technique for the shutdown router to signal that it is undergoing a controlled shutdown, the BGP peers may also continue using such routes for forwarding until any available backup routes have been promoted and advertised. While this technique does not eliminate the possibility of short-lived black holes and/or forwarding loops inherent in the BGP protocol, it does substantially narrow the time during which they can occur.

The present invention is directed to a graceful shutdown technique that modifies a routing protocol, such as BGP, to allow an intermediate node, such as BGP router 300, to announce to its peers its intention to be gracefully shutdown and removed from service in a network. To that end, the technique enables the shutdown router to continue forwarding packets over the network for the grace period, i.e., the router maintains the validity of those original routes so that packets mapped to the routes are not dropped (at least during the grace period). The grace period also allows backup paths to be propagated to each peer and put into service prior to a final withdrawal of the shutdown router's paths from the peer's FIB. Thus, the grace period enables the network to continue using the shutdown router as a next hop as it reconverges to use the alternate, backup paths.

According to the invention, the graceful shutdown technique modifies the BGP protocol to provide novel subcodes to the Notification message 600 with error code Cease specified in field 622. FIG. 7 is a table illustrating these subcodes 700, which include Administrative Graceful Router Shutdown (e.g., subcode 9) and Administrative Graceful Router Reset (e.g., subcode 10):

| Subcode | Symbolic Name |
| --- | --- |
| 9 | Administrative Graceful Router Shutdown |
| 10 | Administrative Graceful Router Reset |

A shutdown router indicates that it is able to continue forwarding for the grace period by inserting one of the novel subcodes 700 in the modified Notification message. Each modified Notification message with a Graceful Shutdown/Reset subcode (hereinafter "Graceful Shutdown Notification message") also includes a FIB retention time in the data field 626 of the message 600. The BGP router sets the FIB retention time in field 626 to a value representing the grace period, i.e., a minimum length of time, in seconds, during which the shutdown router will maintain its forwarding state after sending the Graceful Shutdown Notification message. In the illustrative embodiment, a default value of five (5) seconds is provided as the grace period.

Figure 8:
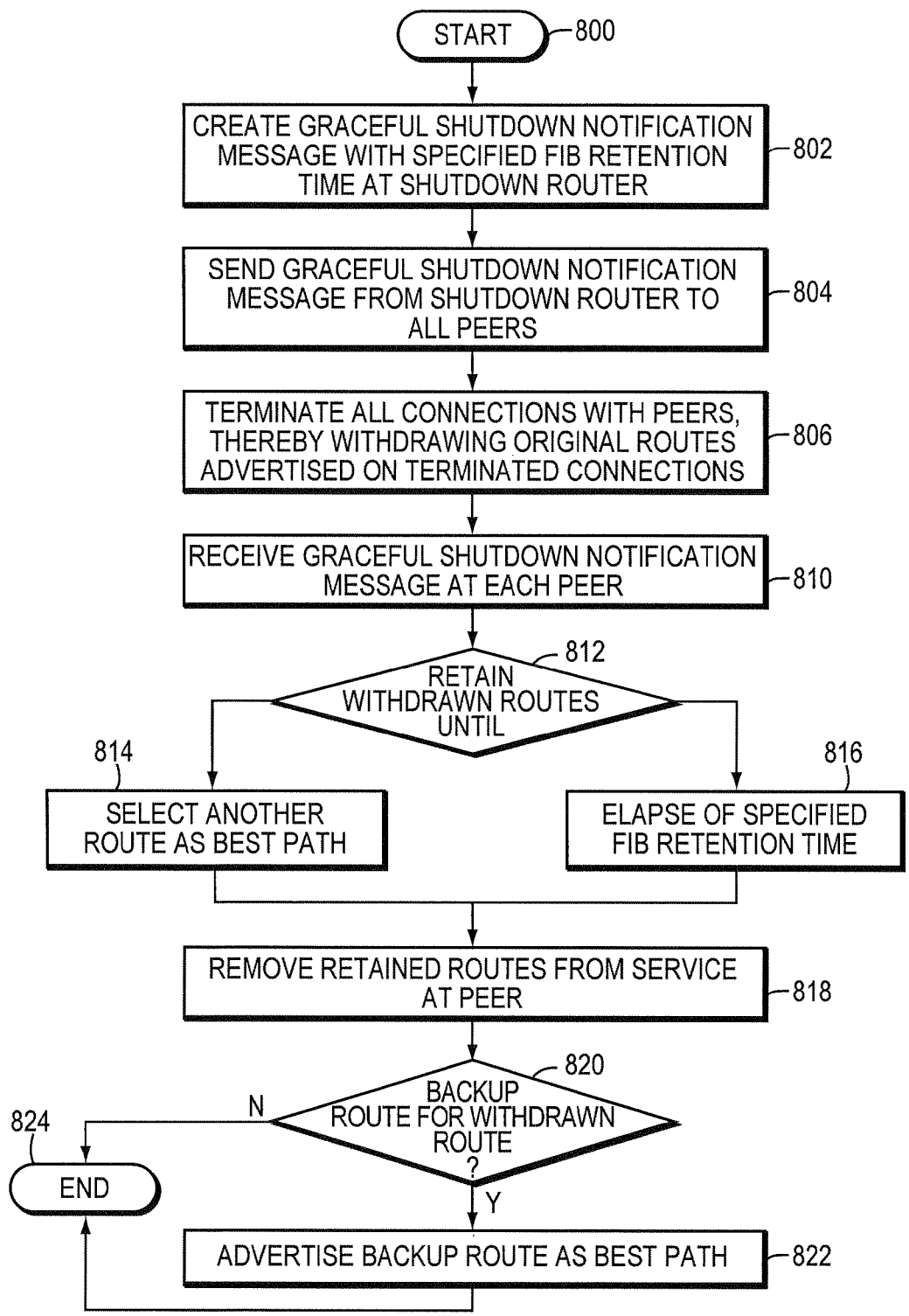
FIG. 8 is a flowchart illustrating a sequence of steps pertaining to a graceful shutdown technique according to the present invention.

FIG. 8 is a flowchart illustrating a sequence of steps pertaining to the graceful shutdown technique according to the present invention. The graceful shutdown technique is illustratively employed by a BGP router that is about to undergo a controlled shutdown. The sequence starts at Step 800 and proceeds to Step 802 where the shutdown router creates a Graceful Shutdown Notification message specifying the Graceful Shutdown/Reset code and a FIB retention time. In Step 804, the Graceful Shutdown Notification message is sent to all peers of the shutdown router, thereby announcing the shutdown router's intention to be removed from service in the network. In Step 806, the shutdown router terminates all connections with its peers and, by doing so, implicitly withdraws all original routes, including those for which it is the best path, advertised on the terminated connections.

In Step 810, each BGP peer receives the Graceful Shutdown Notification message and, in Step 812, retains the withdrawn routes associated with the terminated connection until either of two events occur: (1) another route is selected as the best path (Step 814) or (2) the retention time (grace period) specified in the Graceful Shutdown Notification message has elapsed (Step 816). For the purpose of selecting which route is the best path (i.e., the first event), routes associated with the Graceful Shutdown Notification message must be treated as worse than any alternate route other than an alternate which is (itself) associated with another Graceful Shutdown Notification message. Such routes are referred to as "last resort" routes because they are only used if no alternative is available. Note that if two routes are both associated with connections/sessions for which Graceful Shutdown Notification messages have been received, typical BGP tie-breaking applies between them.

In Step 818, the retained routes are removed from service (i.e., from the FIB 330) by the peer. Specifically, after the first event (selection of another best path) occurs, the peer may remove the retained routes from its FIB, whereas after the second event (elapse of the retention time) occurs, the peer must remove the retained routes from its FIB. In other respects, the Graceful Shutdown Notification message is treated in accordance with the conventional BGP protocol. The effect of this is that if, in Step 820, a BGP peer receiving the Graceful Shutdown Notification message holds a backup route for any of the withdrawn routes, that backup route is selected as best path and advertised over the network in Step 822 as part of BGP protocol operation. The sequence then ends at Step 824.

Figure 1:
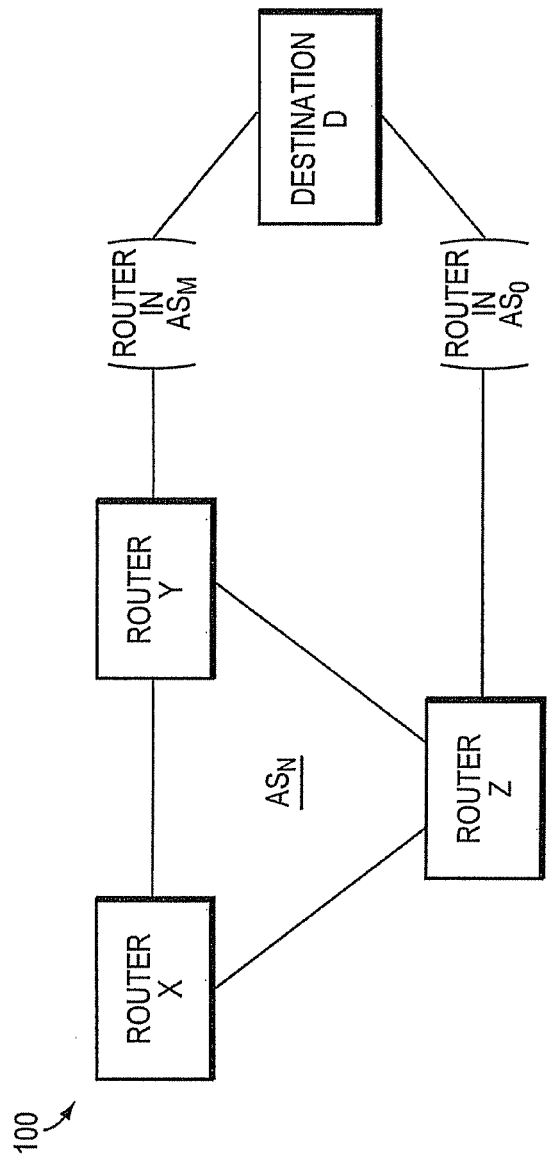
FIG. 1 is a schematic block diagram illustrating an arrangement of intermediate nodes, such as routers, within an autonomous system of a computer network.

The inventive technique further provides the notion of marking the original routes as last resort routes and, by doing so, triggering other routers in the network to announce backup routes and re-converge without fully withdrawing the original routes. For example and referring again to FIG. 1, router X knows only the best path (for which router Y is the next hop). According to the invention, when BGP 500 in router Y is gracefully shutdown/reset, routers X and Z receive appropriate notification from the novel Graceful Shutdown Notification message. Therefore, routers X and Z mark the current route to the destination D as "last resort". Router Z then computes a new path (excluding router Y as a potential next hop) to destination D and advertises the new path to router X. Router X starts using the new path advertised by router Z.

Advantageously, the inventive graceful shutdown technique enables controlled shutdown of a router in a manner that reduces loss of user traffic in a network as opposed to simply halting the router and re-converging the network. In addition, the inventive technique does not adversely change the scaling properties of the network. That is, the present invention does not require routers in the network to store additional paths solely for possible use as backup paths in the event the best path is withdrawn. Moreover, in any network that contains multiple routes for every prefix, the inventive technique described herein results in behavior indistinguishable from operation of the conventional BGP protocol.

While there has been shown and described an embodiment of a graceful shutdown technique that modifies a routing protocol to allow an intermediate node, such as a router, to announce to its peers its intention to be gracefully shutdown and removed from service in a network, it is to be understood that various other adaptations and modifications may be made within the spirit and scope of the present invention. For example, the technique provided herein is backward compatible and, as such, requires no special capability advertisement or other deployment considerations. That is, if a router that does not implement the novel technique receives a Graceful Shutdown Notification message, it simply treats the message as any other conventional BGP Notification message and removes the withdrawn routes associated with terminated session. Although the router will not gain any of the benefits provided by the inventive technique, it will not perform any worse than it would otherwise.

The foregoing description has been directed to specific embodiments of this invention. It will be apparent, however, that other variations and modifications may be made to the described embodiments, with the attainment of some or all of their advantages. For instance, it is expressly contemplated that the teachings of this invention, including the various processes described herein, can be implemented as software, including a computer-readable medium having program instructions executing on a computer, hardware, firmware, or a combination thereof. In addition, it is understood that the data structures described herein can include additional information while remaining within the scope of the present invention. Furthermore, the inventive technique may apply generally to distance vector routing protocols such as, e.g., IGRP, EIGRP or RIP. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method comprising:
generating a notification message that indicates that a router is to be gracefully removed from service and that one or more best paths through the router are to be treated as paths of last resort from receipt of the notification message until the router is removed from service;
sending the notification message to peers of the router in a network to trigger the peers to announce backup paths and to place one or more of the backup paths into service to replace the one or more best paths;
continuing to forward packets from the router for a grace period after sending the notification message, to permit the announced backup paths to be propagated among peers, and to be placed into service, prior to withdrawal from service of the best paths through the router; and
removing the router from service at the expiration of the grace period.

2. The method of claim 1 wherein the router implements Border Gateway Protocol (BGP) and the notification message is a BGP Notification message.

3. The method of claim 2 wherein the BGP Notification message includes an error code Cease and one of an Administrative Graceful Shutdown subcode and an Administrative Graceful Reset subcode.

4. The method of claim 1 further comprising:
setting a data field of the notification message with a value, the value indicating a minimum length of time during which the router will remain in service after sending the notification message.

5. The method of claim 1 wherein removing the router from service comprises removing routes the router has advertised from a forwarding information base (FIB) of the router.

6. The method of claim 1 wherein removing the router from service comprises terminating Border Gateway Protocol (BGP) connections between the router and the peers by:
closing associated Transmission Control Protocol (TCP) connections with the peers;
clearing of an Adjacency RIB In of a BGP database; and
deallocating resources for the BGP connections.

7. A method comprising:
receiving a notification message that indicates a router is to be gracefully removed from service, the notification message indicating that the router will continue to forward packets for a grace period before withdrawing paths through the router from service;

in response to receiving the notification message, marking a best path through the router that is to be withdrawn from service as a last resort path;

attempting to select a path that does not pass through the router as the best path;

continuing to utilize the last resort path through the router that is to be withdrawn from service until the path that does not pass through the router is selected as the best path or the grace period has elapsed; and in response to the path that does not pass through the router being selected as the best path or the grace period elapsing, ceasing to utilize the last resort path through the router.

8. The method of claim 7 wherein the router is a Border Gateway Protocol (BGP) router and the notification message is a BGP Notification message.

9. The method of claim 8 wherein the BGP Notification message includes an error code Cease and one of an Administrative Graceful Shutdown subcode and an Administrative Graceful Reset subcode.

10. The method of claim 7 wherein the notification message includes a data field with a value, the value indicating a minimum length of time during which the router will remain in service after having sent the notification message.

11. The method of claim 7 wherein ceasing to utilize the last resort path through the router comprises removing the last resort path from a forwarding information base (FIB).

12. The method of claim 7 further comprising:
if there is a backup path for the last resort path through the router, selecting the backup path as the best path.

13. The method of claim 7 further comprising:
triggering a network to announce the path that does not pass through the router and re-converge.

14. An apparatus comprising:
a processor;
a routing protocol module executed by the processor, the routing protocol module operable to generate a notification message that indicates that the apparatus is to be gracefully removed from service at the expiration of a grace period and that one or more best paths through the apparatus are to be treated as paths of last resort from receipt of the notification message until the apparatus is removed from service; and a network interface operable to send the notification message to peers of the apparatus in a network to trigger the peers to announce backup paths and to place one or more of the backup paths into service to replace the one or more best paths, wherein the apparatus is operable to continue to forward packets for the grace period after the notification message is sent, to permit the announced backup paths to be propagated among peers, and to be placed into service, prior to withdrawal from service of the best paths through the apparatus.

15. The apparatus of claim 14 wherein the routing protocol module implements Border Gateway Protocol (BGP) and the notification message is a BGP Notification message.

16. The apparatus of claim 15 wherein the BGP Notification message includes an error code Cease and one of an Administrative Graceful Shutdown subcode and an Administrative Graceful Reset subcode.

17. The apparatus of claim 14 wherein the notification message includes a data field with a value, the value indicating a minimum length of time during which the apparatus will remain in service after having sent the notification message.

18. The apparatus of claim 14 further comprising:
a forwarding information base (FIB) configured to have routes removed therefrom when the apparatus is removed from service.

* * * * *